(12) United States Patent
Mutabdzija et al.

(10) Patent No.: US 7,612,472 B2
(45) Date of Patent: Nov. 3, 2009

(54) METHOD AND APPARATUS FOR MONITORING ENERGY STORAGE DEVICES

(75) Inventors: Srdan Mutabdzija, Somerville, MA (US); Eyob Demissie, Tyngsborough, MA (US); Francis J. Masciarelli, Milford, MA (US); Michael Falcinelli, Boxford, MA (US)

(73) Assignee: American Power Conversion Corporation, W. Kingston, RI (US)

( * ) Notice: Subject to any disclaimer, the term of this patent is extended or adjusted under 35 U.S.C. 154(b) by 371 days.

(21) Appl. No.: 10/764,343

(22) Filed: Jan. 23, 2004

(65) Prior Publication Data
US 2005/0162129 A1 Jul. 28, 2005

(51) Int. Cl.
*H02J 7/00* (2006.01)
(52) U.S. Cl. ........................... 307/150; 702/63
(58) Field of Classification Search ............... 307/66, 307/150; 702/63; 429/61; 320/132, 133, 320/106, 107
See application file for complete search history.

(56) References Cited

U.S. PATENT DOCUMENTS

| | | | |
|---|---|---|---|
| 4,065,711 A | 12/1977 | Kawabata |
| 4,665,322 A | 5/1987 | Eishima et al. |
| 4,673,826 A | 6/1987 | Masson |
| 4,709,202 A | 11/1987 | Koenck et al. |
| 4,763,013 A | 8/1988 | Gvoth, Jr. et al. |
| 4,816,982 A | 3/1989 | Severinsky |
| 4,823,247 A | 4/1989 | Tamoto |
| 4,827,151 A | 5/1989 | Okado |
| 4,831,508 A | 5/1989 | Hunter |
| 4,935,861 A | 6/1990 | Johnson, Jr. et al. |
| 4,943,902 A | 7/1990 | Severinsky |
| 4,964,029 A | 10/1990 | Severinsky et al. |
| 4,980,812 A | 12/1990 | Johnson, Jr. et al. |
| 5,017,800 A | 5/1991 | Divan |
| 5,019,717 A | 5/1991 | McCurry et al. |
| 5,045,989 A | 9/1991 | Higaki et al. |
| 5,047,961 A | 9/1991 | Simonsen |
| 5,057,698 A | 10/1991 | Widener et al. |

(Continued)

FOREIGN PATENT DOCUMENTS

EP 0 574 628 A1 12/1993

(Continued)

OTHER PUBLICATIONS

Symmetra Brochure, "Server, Network and Telecom Power Soultions," pp. 1-20.

(Continued)

*Primary Examiner*—Albert W Paladini
*Assistant Examiner*—Daniel Cavallari
(74) *Attorney, Agent, or Firm*—Lando & Anastasi, LLP

(57) ABSTRACT

An improved battery, monitoring circuit and method for communicating with the battery is provided. Such batteries and communication methods are particularly useful in UPS systems that use such batteries to provide back-up power to electrical loads. In one aspect, performance, manufacturing, trend and/or other data are stored in non-volatile memory of the battery and are communicated to an external system such as a UPS. In another aspect, a method for communicating via single-wire interface is provided. In one aspect, a same interface is used to communicate with both conventional batteries and improved batteries having increased monitoring capabilities.

31 Claims, 11 Drawing Sheets

U.S. PATENT DOCUMENTS

| | | | |
|---|---|---|---|
| 5,089,974 A * | 2/1992 | Demeyer et al. | 340/3.41 |
| 5,099,410 A | 3/1992 | Divan | |
| 5,126,585 A | 6/1992 | Boys | |
| 5,148,043 A | 9/1992 | Hirata et al. | |
| 5,184,025 A | 2/1993 | McCurry et al. | |
| 5,227,262 A | 7/1993 | Ozer | |
| 5,241,217 A | 8/1993 | Severinsky | |
| 5,254,928 A | 10/1993 | Young et al. | |
| 5,272,382 A | 12/1993 | Heald et al. | |
| 5,281,955 A | 1/1994 | Reich et al. | |
| 5,291,383 A | 3/1994 | Oughton | |
| 5,302,858 A | 4/1994 | Folts | |
| 5,315,533 A | 5/1994 | Stich et al. | |
| 5,319,571 A | 6/1994 | Langer et al. | |
| 5,349,282 A | 9/1994 | McClure | |
| 5,382,893 A | 1/1995 | Dehnel | |
| 5,384,792 A | 1/1995 | Hirachi | |
| 5,422,558 A | 6/1995 | Stewart | |
| 5,457,377 A | 10/1995 | Jonsson | |
| 5,458,991 A | 10/1995 | Severinsky | |
| 5,465,011 A | 11/1995 | Miller et al. | |
| 5,477,091 A | 12/1995 | Fiorina et al. | |
| 5,504,415 A | 4/1996 | Podrazhansky et al. | |
| 5,510,690 A | 4/1996 | Tanaka et al. | |
| 5,519,306 A | 5/1996 | Itoh et al. | |
| 5,563,493 A | 10/1996 | Matsuda et al. | |
| 5,579,197 A * | 11/1996 | Mengelt et al. | 361/93.4 |
| 5,602,462 A | 2/1997 | Stich et al. | |
| 5,642,002 A | 6/1997 | MeKanik et al. | |
| 5,654,591 A | 8/1997 | Mabboux et al. | |
| 5,684,686 A | 11/1997 | Reddy | |
| 5,844,328 A | 12/1998 | Furst | |
| 5,901,057 A | 5/1999 | Brand et al. | |
| 5,940,274 A | 8/1999 | Sato et al. | |
| 5,982,652 A | 11/1999 | Simonelli et al. | |
| 6,002,237 A * | 12/1999 | Gaza | 320/116 |
| 6,069,412 A | 5/2000 | Raddi et al. | |
| 6,121,695 A | 9/2000 | Loh | |
| 6,169,669 B1 | 1/2001 | Choudhury | |
| 6,181,103 B1 | 1/2001 | Chen | |
| 6,184,593 B1 | 2/2001 | Jungreis | |
| 6,201,319 B1 | 3/2001 | Simonelli et al. | |
| 6,274,950 B1 | 8/2001 | Gottlieb et al. | |
| 6,292,379 B1 | 9/2001 | Edevold et al. | |
| 6,310,783 B1 | 10/2001 | Winch et al. | |
| 6,317,348 B1 | 11/2001 | Vackar | |
| 6,318,783 B1 | 11/2001 | Knox | |
| 6,381,156 B1 | 4/2002 | Sakai et al. | |
| 6,400,043 B1 | 6/2002 | Batson et al. | |
| 6,400,591 B2 | 6/2002 | Reilly et al. | |
| 6,424,119 B1 | 7/2002 | Nelson et al. | |
| 6,433,444 B1 | 8/2002 | de Vries | |
| 6,445,088 B1 | 9/2002 | Spitaels et al. | |
| 6,455,954 B1 | 9/2002 | Dailey | |
| 6,489,561 B2 | 12/2002 | Ziegler et al. | |
| 6,493,243 B1 | 12/2002 | Real | |
| 6,584,329 B1 * | 6/2003 | Wendelrup et al. | 455/572 |
| 6,654,265 B2 | 11/2003 | Sadler et al. | |
| 6,700,351 B2 * | 3/2004 | Blair et al. | 320/125 |
| 6,803,678 B2 | 10/2004 | Gottlieb et al. | |
| 6,983,212 B2 | 1/2006 | Burns | |
| 2001/0009361 A1 * | 7/2001 | Downs et al. | 320/132 |
| 2001/0012579 A1 | 8/2001 | Vackar | |
| 2002/0136042 A1 | 9/2002 | Layden et al. | |
| 2002/0195997 A1 * | 12/2002 | Peek et al. | 320/134 |
| 2003/0048647 A1 | 3/2003 | Sadler et al. | |
| 2003/0052644 A1 | 3/2003 | Nelson et al. | |
| 2003/0190935 A1 | 10/2003 | Pinder | |
| 2003/0206021 A1 * | 11/2003 | Laletin et al. | 324/426 |
| 2003/0214507 A1 | 11/2003 | Mawatari et al. | |
| 2003/0220026 A1 | 11/2003 | Oki et al. | |
| 2004/0104706 A1 * | 6/2004 | Ooi et al. | 320/132 |
| 2004/0160210 A1 * | 8/2004 | Bohne et al. | 320/111 |
| 2005/0001589 A1 * | 1/2005 | Edington et al. | 320/128 |
| 2005/0036248 A1 | 2/2005 | Klikic et al. | |
| 2005/0162019 A1 | 7/2005 | Masciarelli et al. | |
| 2005/0162129 A1 | 7/2005 | Mutabdzija et al. | |
| 2005/0162836 A1 | 7/2005 | Briggs et al. | |
| 2005/0164563 A1 | 7/2005 | Schuttler et al. | |

FOREIGN PATENT DOCUMENTS

| | | |
|---|---|---|
| EP | 0 575 060 B1 | 9/1996 |
| EP | 1 291 999 A1 | 3/2003 |
| WO | WO 02/057925 A2 | 7/2002 |

OTHER PUBLICATIONS

Invitation to Pay Additional Fees with Partial International Search Report for PCT/US2005/002010 mailed May 13, 2005.

International Search Report for PCT/US2005/002010, mailed Aug. 2, 2005.

European Search Report for EP05711807.7 issued Apr. 28, 2009.

* cited by examiner

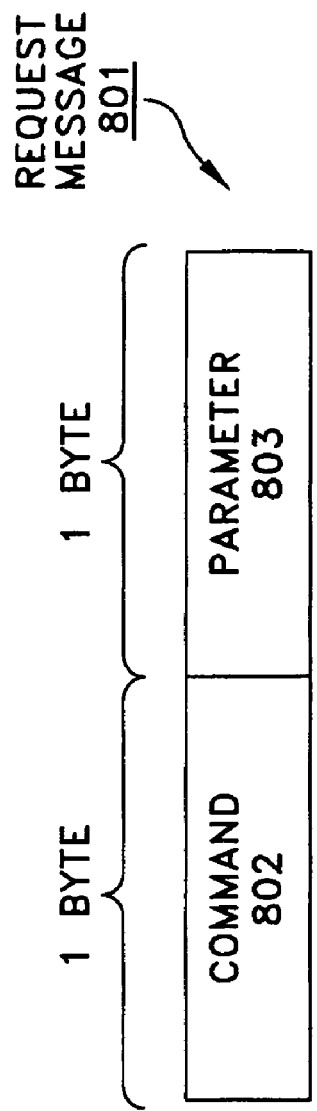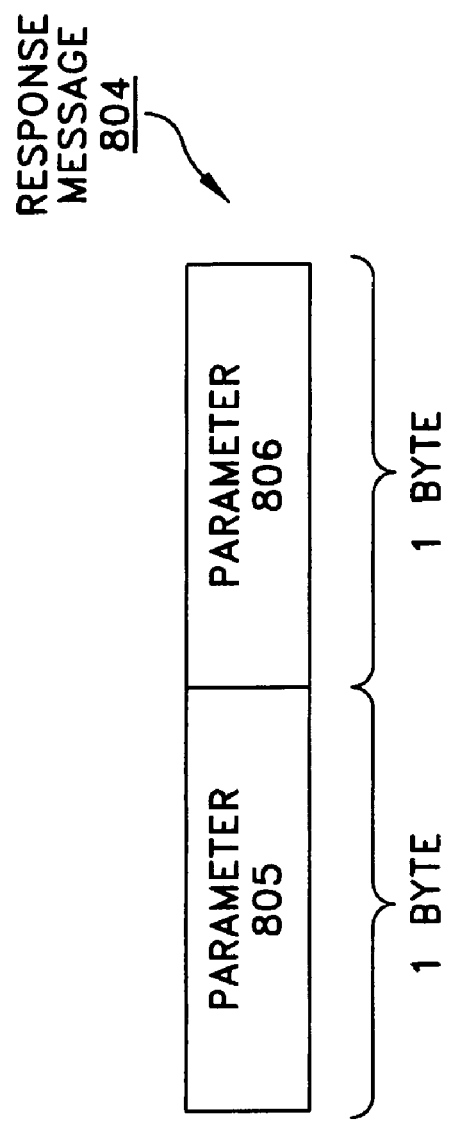
FIG. 8A
FIG. 8B

| COMMAND IDENTIFIER | BIT 0 | BIT 1 | BIT 2 | BIT 3 | COMMAND |
|---|---|---|---|---|---|
| 0x00 | 0 | 0 | 0 | 0 | RESET BATTERY COMMUNICATION |
| 0x01 | 0 | 0 | 0 | 1 | UNUSED |
| 0x02 | 0 | 0 | 1 | 0 | INVALID |
| 0x03 | 0 | 0 | 1 | 1 | ADDRESS/BATTERY SELECT |
| 0x04 | 0 | 1 | 0 | 0 | INVALID |
| 0x05 | 0 | 1 | 0 | 1 | WRITE TO BATTERY (ADDR) |
| 0x06 | 0 | 1 | 1 | 0 | INVALID |
| 0x07 | 0 | 1 | 1 | 1 | READ MEMORY |
| 0x08 | 1 | 0 | 0 | 0 | INVALID |
| 0x09 | 1 | 0 | 0 | 1 | READ TEMPERATURE |
| 0x0A | 1 | 0 | 1 | 0 | INVALID |
| 0x0B | 1 | 0 | 1 | 1 | READ VOLTAGE |
| 0x0C | 1 | 1 | 0 | 0 | INVALID |
| 0x0D | 1 | 1 | 0 | 1 | READ CODE REVISION |
| 0x0E | 1 | 1 | 1 | 0 | INVALID |
| 0x0F | 1 | 1 | 1 | 1 | UNUSED |

TABLE 904

COMMAND 901

COMMAND 902 — bits 0,1,2

BATTERY 1 ADDRESS 903 — bits 3,4,5,6,7

FIG. 9

METHOD AND APPARATUS FOR MONITORING ENERGY STORAGE DEVICES

FIELD OF THE INVENTION

The field of the invention relates generally to energy storage devices, and more particularly, to energy storage devices used in an Uninterruptible Power Supply (UPS) system.

BACKGROUND

There are numerous types of Uninterruptible Power Supply (UPS) systems for supplying backup alternating current (AC) or direct current (DC) power to electrical loads. These UPS systems generally use batteries or types of other energy storage devices that supply such power when a main power supply (e.g., line power) is not available. For example, backup power is provided when power from an AC source performs outside acceptable limits or fails altogether.

These UPS systems generally use multiple energy storage devices configured in parallel or in series to provide backup power. In such systems, it is important to be able to accurately estimate the remaining time period that the UPS system can supply backup power. Conventionally, UPS systems connected to energy storage devices estimate the time remaining by modeling each of the many devices in the system, and performing a calculation that estimates the time remaining. For instance, the UPS system generally models devices such as batteries based on what types of batteries are installed in the UPS system. The different types of batteries are identified using a number of methods. One way of identifying battery types includes manually (e.g., by a system administrator) identifying each battery type, and program the battery type into the time remaining calculation using an interface of the UPS.

In another instance, a resistor is included within each battery, the resistor having a resistance value that is correlated with a particular type of battery. The UPS is configured to measure the resistance of the resistor in the battery and therefore identify the type of battery installed within the UPS system. However, with each new type of battery type provided, a new resistor value is required to uniquely identify the new type of battery, and therefore the UPS system needs to recognize the new resistance and battery type. Because of this method, a very limited number of different battery types can be supported by a particular UPS. What is needed is a more flexible and accurate way of recognizing and modeling batteries to estimate time remaining in a UPS system.

Also, because batteries fail from time to time, either from overuse (e.g., charging and discharging cycles) or being exposed to other conditions (e.g., an over-temperature condition) that cause the batteries to be incapable of storing energy, it is beneficial to monitor batteries by the UPS system to identify failed batteries that might affect the performance of the UPS system. Several conventional systems monitor such parameters as battery temperature, float voltage, etc. for each battery, and provide alarms indicating that a particular battery has failed. In such systems, such monitoring is provided by either a monitoring subsystem installed in each battery or a monitor of the UPS allocated to each battery module.

SUMMARY

Various aspects of the present invention relate to improved methods and apparatuses for monitoring batteries, particularly in UPS systems. There are many disadvantages of current battery monitoring technologies currently used in UPS systems. In particular, dedicated monitor circuits allocated to each battery are generally expensive and include complex circuits that serve as another point of failure in the UPS system. One type of conventional battery monitoring system is shown and described in U.S. Pat. No. 6,274,950 by Gottleib et al. that describes such a UPS system having monitors integrated within each battery module. In UPS systems wherein the monitor is not included within the battery module, when the battery module is removed from the UPS system, there is no performance information retained with the battery itself. Because data is not retained with the battery, it is more difficult to troubleshoot problems with failed batteries. Further, inadequate battery modules may then be erroneously installed in the problem UPS or other UPS system.

Monitor circuits that are a part of the battery module are either traditionally very simple, and do not provide adequate monitoring capability or are very complex and also prove to be another point of failure in the system. For example, in one such system, only the current temperature output voltage and current indications are provided under certain conditions. For example, temperature readings are provided only when a switch is operated in a sensor of the battery module and is monitored by the UPS system. Also, more complex monitoring circuits inside the battery include many parts that are subject to failure, and increase the cost of the batteries and overall UPS system. Conventional monitoring circuits that are installed in a battery use battery power when running and when in storage. It would be beneficial to have a battery monitoring circuit that does not drain batteries when in storage or during normal operating period of the UPS system.

There is also a need for an inexpensive battery monitor circuit. However, a monitor is desired that provides increased monitoring capabilities. It is a challenge to provide a cost-effective monitoring of the battery while increasing monitoring functionality. According to one aspect of the present invention, a battery monitor is provided that allows higher-level monitor functions to be performed yet minimizes costs of monitoring battery components.

Further, there is a need for a battery monitor that stores data in a persistent manner beyond a storage period without draining the battery in the module. In one embodiment, the battery monitor includes a nonvolatile memory that stores information associated with the battery. In another embodiment, the battery is capable of reporting manufacturing data such as serial number, manufacturing date, etc. that can be used for troubleshooting and management of the UPS system (e.g., identifying faulty batteries to ensure that they are not reintroduced elsewhere within the system, used for inventory control and management). In another embodiment, the battery is capable of reporting characteristics of the battery to an attached UPS so that the battery may be modeled more accurately, and therefore, the UPS can more accurately predict the time remaining based on the model.

According to another aspect of the invention, it is realized that it would be beneficial to include an interface that works both with existing batteries and a new battery monitor circuit without requiring additional interface connections. In one embodiment, the UPS is capable of interfacing with current batteries without monitoring capabilities and newer batteries with monitoring capability using the same electrical interface. In another embodiment, the interface is a single wire that is used typically to detect that a battery is present in the UPS system. When used with older-type batteries that use the interface for battery detection, the interface functions in a conventional manner. When a newer-type battery is installed, the UPS system and battery are capable of communicating data with each other over this interface.

According to one aspect of the invention, a battery is provided having an apparatus for monitoring the battery. The battery comprises one or more cells that provide power to at least one output, and a monitor that is adapted to monitor and store performance information relating to the operation of the one or more cells, and which is adapted to communicate with an external system, and that is adapted to receive a monitor signal from an external system, wherein the monitor is coupled to the one or more cells and is adapted to receive power for the monitor from the external system. According to one embodiment of the invention, the battery is in combination with an Uninterruptible Power Supply (UPS) system. According to another embodiment, the monitor is adapted to perform a reset if the received power is insufficient.

According to another embodiment, the monitor includes an associated memory in which the monitor is adapted to store the performance information. According to another embodiment, the memory is a nonvolatile-type memory. According to another embodiment, the nonvolatile-type memory is an EEPROM.

According to another embodiment, the monitor is adapted to communicate with the external system by interrupting current of received power provided by the external system. According to another embodiment, the monitor is adapted to receive a monitor signal from the external system and wherein the monitor is adapted to receive power from the external system via the monitor signal.

According to another embodiment, the monitor is adapted to communicate in an asynchronous manner with the external system. According to another embodiment, a start of communication with the battery is initiated by the external system by interrupting the current of the power supply. According to another embodiment, the monitor is adapted to detect the start of communication, and is adapted to receive, after the start of communications is detected, a request message from the external system. According to another embodiment, the monitor is adapted to transmit a response message in response to the received request message.

According to another embodiment, the monitor comprises an LC-type oscillator that provides clocking for the monitor. According to another embodiment, the monitor comprises a crystal oscillator that provides clocking for the monitor.

According to another embodiment, the monitor is adapted to store manufacturing information relating to the battery. According to another embodiment, the manufacturing information includes a model type of the battery, and wherein the monitor is adapted to communicate the model type to the external system. According to another embodiment, the manufacturing information includes a serial number of the battery, and wherein the monitor is adapted to communicate the serial number to the external system. According to another embodiment, the manufacturing information includes rating information of the battery, and wherein the monitor is adapted to communicate the rating information to the external system.

According to another embodiment of the invention, the manufacturing information includes a manufacturing date of the battery, and wherein the monitor is adapted to communicate the manufacturing date to the external system. According to another embodiment of the invention, the manufacturing information includes one or more battery constants, and wherein the monitor is adapted to communicate the one or more battery constants to the external system. According to another embodiment, the manufacturing information includes one or more battery constants that relate to the battery's expected performance, and wherein the monitor is adapted to communicate the one or more battery constants to the external system.

According to another embodiment, the battery further comprises a temperature sensor, and wherein the manufacturing information includes one or more constants relating to the temperature sensor, and wherein the monitor is adapted to communicate the one or more constants to the external system. According to another embodiment, the battery module contains a disconnect switch, a supplementary contact to sense the position of the disconnect switch and the ability to communicate the position to the external system. According to another embodiment, the battery further comprises a resistor used to detect current provided by the battery, and wherein the manufacturing information includes parameters related to the resistor, and wherein the monitor is adapted to communicate the parameters related to the resistor to the external system. According to another embodiment, the monitor is adapted to store performance information indicating performance of the battery. According to another embodiment, the monitor is adapted to store the performance information periodically.

According to another embodiment, the performance information includes a count of the number of discharges of the battery, and wherein the monitor is adapted to communicate the number of discharges of the battery to the external system. According to another embodiment, the performance information includes a software identifier of the monitor, and wherein the monitor is adapted to communicate the software identifier of the monitor to the external system. According to another embodiment, the performance information includes a temperature of the battery, and wherein the monitor is adapted to communicate the temperature of the battery to the external system. According to another embodiment, the performance information includes an accumulated time that the battery is in a charge state, and wherein the monitor is adapted to communicate the accumulated time to the external system. According to another embodiment, the performance information includes an accumulated time that the battery is in a floating state, and wherein the monitor is adapted to communicate the accumulated time to the external system. According to another embodiment, the performance information includes an accumulated time the battery is in a discharging state, and wherein the monitor is adapted to communicate the accumulated time to the external system. According to another embodiment, the performance information includes a maximum temperature experienced by the battery, and wherein the monitor is adapted to communicate the maximum temperature to the external system.

According to one aspect of the invention, a method is provided for communicating with a battery module comprising acts of providing for a single-wire interface to the battery module, receiving, at the battery over the single-wire interface, a request for information from an external system, and transmitting, by the battery to the external system over the single-wire interface, a response to the request. According to another embodiment, the battery module receives power over the single-wire interface and wherein the act of transmitting comprises an act of transmitting data over the single-wire interface by interrupting current.

According to another embodiment, the act of transmitting comprises an act of transmitting data asynchronously. According to another embodiment, the act of transmitting comprises an act of transmitting battery model type data to the external system. According to another embodiment, the act of transmitting comprises an act of transmitting serial number data to the external system. According to another embodiment, the act of transmitting comprises an act of transmitting rating information related to the battery to the external system. According to another embodiment, the act of transmitting comprises an act of transmitting manufacturing data to the external system. According to another embodiment, the act of transmitting comprises an act of transmitting a manufacturing date of the battery to the external system. According to another embodiment, the act of transmitting comprises an act of transmitting battery constant data to the external system. According to another embodiment, the act of transmitting comprises an act of transmitting temperature data to the external system. According to another embodiment, the act of transmitting comprises an act of transmitting data relating to a temperature sensor of the battery to the external system. According to another embodiment, the act of transmitting comprises an act of transmitting manufacturing data to the external system.

According to another embodiment, the battery comprises a resistor used to detect current and wherein the act of transmitting comprises an act of transmitting one or more parameters that relate to the resistor to the external system. According to another embodiment, the act of transmitting comprises an act of transmitting a serial number of the battery to the external system. According to another embodiment, the battery includes a processor that executes software and wherein the act of transmitting comprises an act of transmitting a software identifier of the software to the external system.

According to another embodiment, the act of transmitting comprises an act of transmitting battery type data that identifies a type of the battery to the external system. According to another embodiment, the method further comprises an act of storing performance data relating to the performance of the battery in a memory of the battery. According to another embodiment, the act of storing further comprises an act of storing the performance data in a nonvolatile memory associated with the battery. According to another embodiment, the external system is a UPS. According to another embodiment, the method further comprises an act of receiving, by a monitor circuit of the battery, power over the single-wire interface. According to another embodiment, the method further comprises an act of providing for communicating to the battery over a single-wire interface, the interface being used to provide power to a monitoring circuit of the battery.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears. All references cited herein are expressly incorporated by reference.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings,

FIG. 8A is a block diagram of a request message in accordance with one embodiment of the invention;

FIG. 8B is a block diagram of a response message in accordance with one embodiment of the invention;

FIG. 9 is a diagram of a command message format and valid command byte values according to various embodiments of the invention;

DETAILED DESCRIPTION

Figure 1:
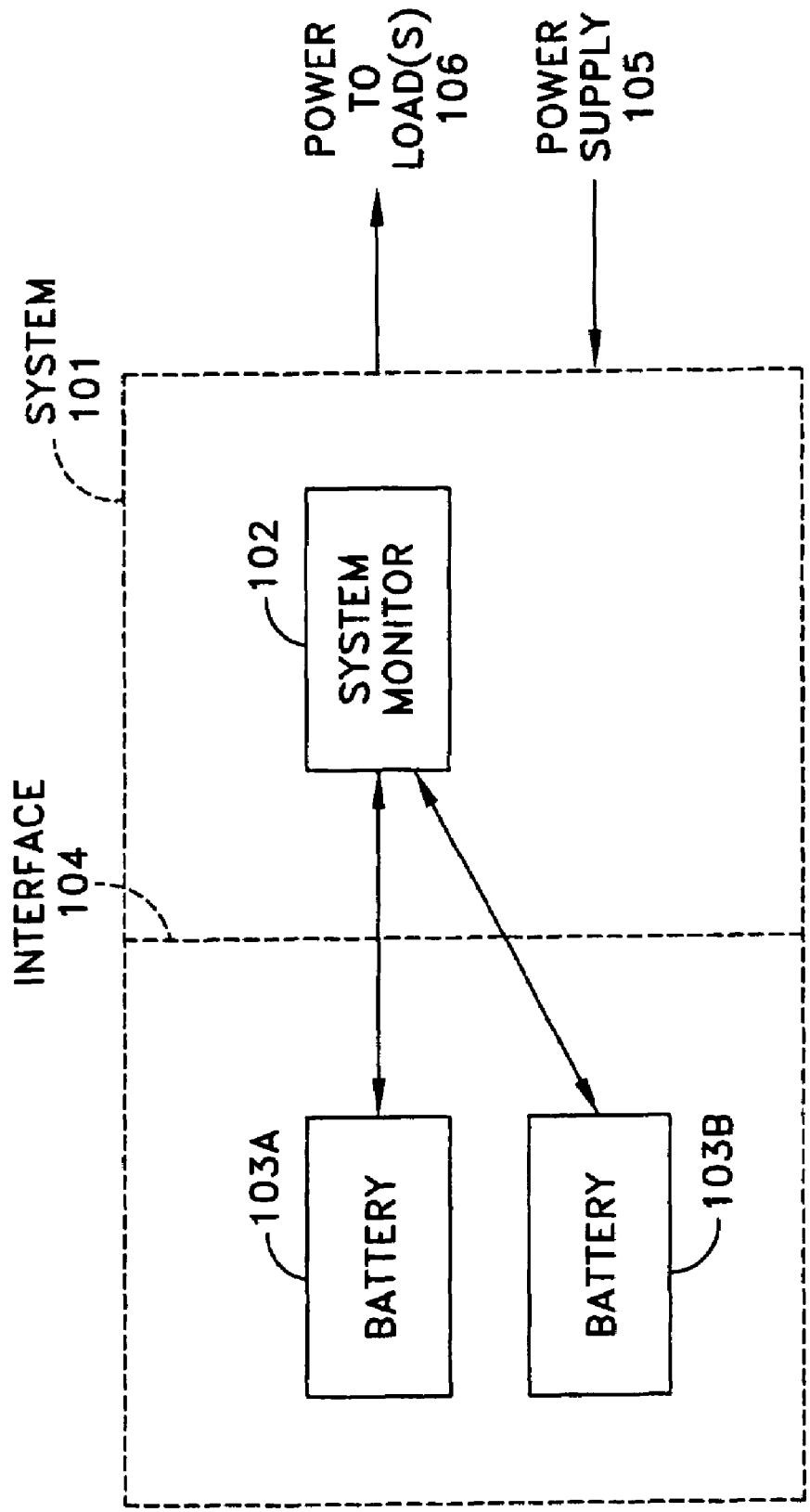
FIG. 1 is a block diagram showing a system in which various embodiments of the invention may be practiced.

FIG. 1 shows a system 101 in which various embodiments of the invention may be practiced. For instance, system 101 may be a UPS system having a system monitor 102 and one or more batteries 103A-103B. System monitor 102 may perform monitoring of the overall UPS system 101, and may monitor the one or more batteries 103A-103B through a communication interface 104. Interface 104 may be any interface used to communicate data, however, various aspects of the invention as described in more detail below describe an improved battery monitor and associated communications interface for use in communication with a battery or other energy storage device of a UPS.

UPS system 101 may be, for example, an AC-AC or AC-DC class UPS system. UPS systems and their circuitry are well-known in the art, and are available commercially from a number of companies including the American Power Conversion Corporation located in West Kingston, RI. System 101 may also include circuitry that, when system 101 detects a degradation or fault in power 105 being supplied to system 101, uses battery power to supply the appropriate power output to the attached loads 106. Batteries 103A-103B may be, for example, 120V battery modules that include a number of separate cells arranged in series within each battery module (e.g., ten 12V cells arranged in series to form a 120V battery module). It should be appreciated that the invention is not limited to any particular UPS system, battery type, voltage, or configuration, but rather various aspects of the invention may be used with any type of UPS system and any battery.

According to one aspect of the invention, an improved interface is provided for communicating between a UPS system and a battery. According to one aspect of the present invention, it is desirable to use the same electrical interface to conventional batteries for communicating data to improved batteries that have increased data storage, monitoring and communication capabilities. An advantage of using the same electrical interface includes backward compatibility with conventional batteries, and the UPS system is easily configurable with either improved or conventional batteries. However, with improved monitoring capabilities of improved batteries, the UPS becomes more accurate in estimating remaining battery time, and management of batteries is improved.

Figure 11:
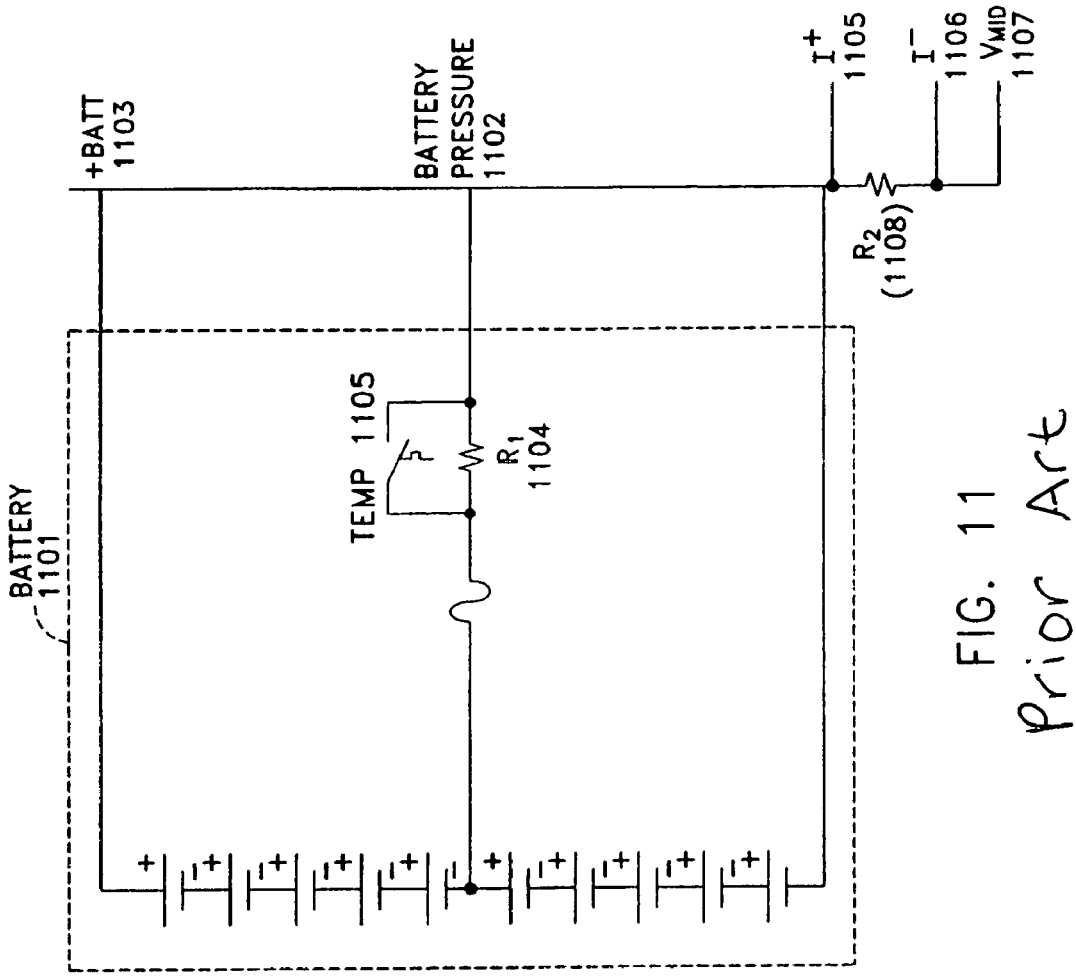
FIG. 11 is a block diagram of a conventional battery module with which UPS systems according to various embodiments may operate.

A conventional method for monitoring battery operation is shown in FIG. 11. Battery 1101 includes one or more cells arranged in series to form a battery module having a positive terminal (+BATT 1103) and a negative terminal (VMID 1107). In a UPS coupled to battery 1101, the presence of a battery 1101 is determined by the UPS by applying an external voltage to a midpoint of the battery (battery presence signal 1102). Current flowing through the battery is measured by sensing the voltage drop across a small value resistor $R_2$ (item 1108) at terminals I⁺ (item 1105) and I⁻ (item 1106). In a conventional UPS system, resistor $R_1$ is mounted on a backplane of the UPS. Also, temperature of the battery is monitored by measuring the current provided by the battery presence signal 1102. More particularly, a temperature sensitive resistance (switch thermostat TEMP 1105) is placed in parallel with a known resistance $R_1$ (item 1104) (e.g., 100 K ohms), and therefore the measured current may be used to measure the resistance of the thermostat and interpolate the current temperature value based on the measured resistance. The components used in battery 1101 (e.g., resistor $R_2$) need to have carefully chosen values so that accurate measurements (e.g., current, temperature) can be made by an external system. Further, this conventional battery 1101 has no intelligence or circuit for storing operating data.

Figure 2:
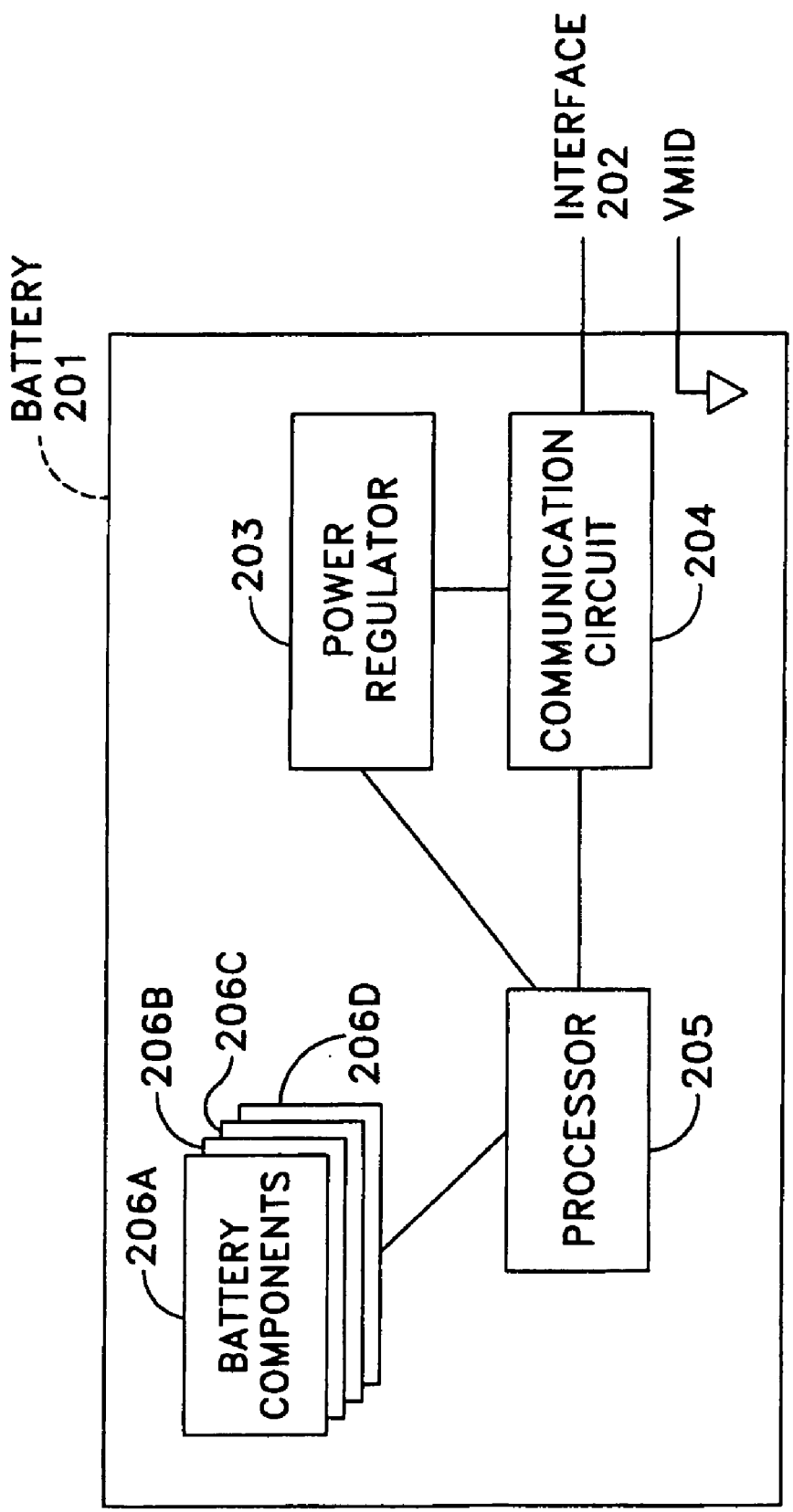
FIG. 2 is a block diagram showing a battery and monitor in accordance with one embodiment of the invention.

An improved battery module 201 is shown in FIG. 2. Battery module 201 (also referred to more simply as battery 201) includes one or more battery components 206A-206D (collectively, item 206) that provide power to a UPS system (e.g., system 101). For instance, one or more battery modules (e.g., battery module 201) may be installed as a part of a UPS system to provide power to one or more loads. Battery 201 may be used in conjunction with any UPS system. For example, battery 201 may be used in conjunction with the UPS system described in U.S. Patent Application filed Jan. 23, 2004, application Ser. No. 10/764,344, entitled "Methods and Apparatus for Providing Uninterruptible Power," incorporated by reference herein in its entirety. However, it should be appreciated that battery 201 and/or communication methods may be used with any type of UPS system, and the invention is not limited to any particular UPS type or system.

Components 206A-206D may be individual cells arranged in a variety of configurations. In one embodiment, component 206 includes ten (10) batteries, each of which contain six (6) cells and produce 12V of DC power. These ten batteries are arranged electrically in a serial configuration to provide a total 120V output. Of course, it should be appreciated that various aspects of the invention may be performed in any other battery type, voltage or configuration, and the invention shall not be limited to any particular battery type, voltage or configuration.

Management and monitoring of battery module 201 is performed by processor subsystem 205, which may be, for example, based on a PICmicro PIC16C72 microcontroller processor available from the Microchip Technology Corporation, Chandler, Ariz. However, it should be appreciated that any inexpensive processor (e.g., a microcontroller) may be used. Processor subsystem 205 executes code stored in a non-volatile memory, stores working variables in RAM memory and stores data values within a nonvolatile memory (e.g., an EEPROM). For example, the PICmicro PIC16C72 processor contains 2 K words of EEPROM for program code and another 128 bytes of RAM memory. Also, 512 bytes of external electrically alterable EEPROM are used for persistent data storage. As discussed, this memory may be used for storing performance data and/or manufacturing data associated with battery 201. According to one embodiment, processor 205 stores battery performance data in nonvolatile memory such that performance data is maintained with the battery as it is moved within the UPS or among other UPS systems. According to another embodiment, processor 205 is capable of reading manufacturing data from memory, and providing the data to an external system (e.g., a UPS system). This manufacturing data may be used by the external system identify and track battery 201, or perform measurements (e.g., temperature, remaining time, etc.) on the battery in a more accurate manner.

Processor 205 includes one or more data input/output port (s), at least one of which is used to communicate data between the UPS system and processor 205. For instance, processor 205 includes an output serial port and an input serial port that is coupled to a communication circuit 204 which communicates the data to/from the UPS system. In one embodiment of the invention discussed below with particularity to FIG. 6, data is communicated in an asynchronous manner between battery 201 and the UPS system.

Battery 201 further includes a power regulator 203 that receives power from a communication circuit 204, and provides, in turn, regulated power for elements of battery 201 including, for example, processor 205 and communication circuit 204. Significantly, power regulator 203 receives power from an external monitor through communication circuit 204, and therefore, monitoring functions performed on battery 201 do not consume battery power. In one embodiment, battery 201 also includes an interface 202 that is used in lieu of the battery presence connection to the UPS system (e.g., system 101) as is used in conventional batteries. All components in 201 may be referenced to system power return, VMID.

Figure 3:
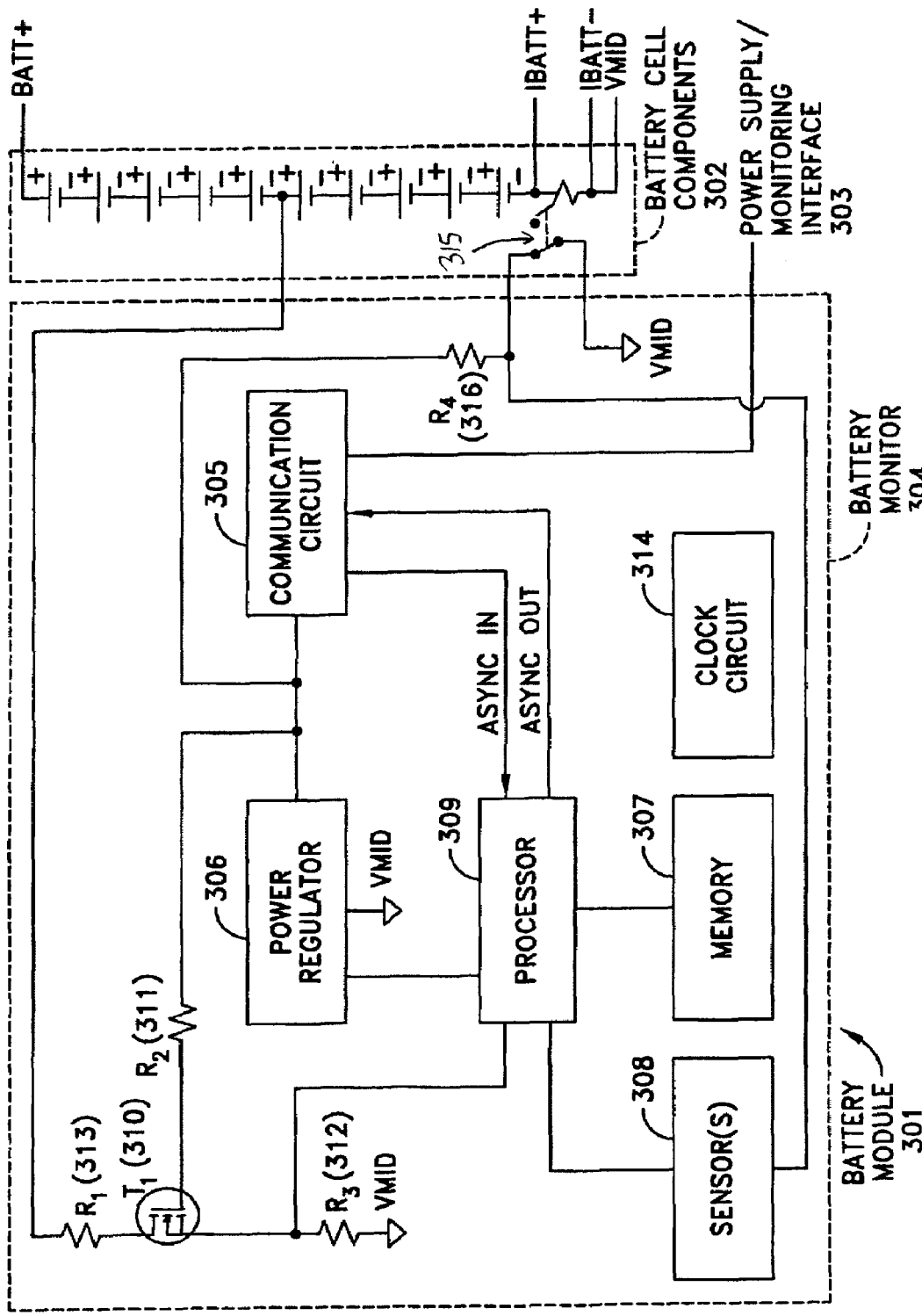
FIG. 3 is a block diagram showing a battery and monitor in accordance with another embodiment of the invention.

FIG. 3 shows another embodiment of a battery module 301 according to one embodiment of the invention. Battery module 301 is functionally similar to battery 201, and battery module 301 includes a number of components. Similar to battery 201, battery includes a number of battery elements that, when arranged, form a single power supply. In battery 201, battery components are 12V batteries arranged serially to form a 120V power supply. Battery module 301 includes, within a housing of the battery, a battery monitor 304 that monitors battery performance.

Battery monitor 304 accepts a power supply/monitoring interface 303 from a UPS system using return through VMID (which is the battery return) (e.g., system 101). Interface 303 may be electrically similar to that of a conventional interface 1102 as shown in FIG. 11 as discussed above. More particularly, interface 303 is a 12V voltage and communication signal provided by the UPS system used to detect the presence and operating temperature of a battery module and other functions using VMID as return. In one embodiment, interface 303 allows the communication of information between battery module 301 and a UPS system with which battery module 301 is associated. Battery module 301 includes a communication circuit 305 that receives the 12V power signal, and is capable of receiving and transmitting data over the same interface. In one embodiment, both data is received and transmitted to the UPS system over a single wire interface—the same single wire interface that provides power to the battery monitor 304.

Component power regulator 306 has enough capacitance to hold up voltage so that the 5V regulator maintains the correct voltage on processor 309 to allow processor 309 to operate with the dropouts on the power supply/monitoring interface 303 when communication is in progress. The data transmission rate and message length may be adjusted to allow processor 309 to receive and transmit data without losing power.

The load of the processor 309 and rest of Battery Monitor 304 set the current on condition of the power supply/monitoring interface 303.

Battery monitor 304 may include a connection to the midpoint of battery cell components 302. This mid-point may be the electric center of components 302, but it should be appreciated that other voltages can be monitored. This voltage signal is passed through a resistance $R_1$ (item 313) to a transistor $T_1$ (item 310). $T_1$ is coupled to the power input of battery monitor 304 through resistor $R_2$ (item 311). When power is removed to communication circuit 305, power is removed from $T_1$, which opens, and therefore, there is no load on components 302 when battery module 301 does not receive power through interface 303. That is, when battery module 301 is removed from its associated UPS (e.g., during a storage period), no load is present on the battery from battery monitor 304.

Processor 309 is similar in function to processor 205 as discussed above with respect to FIG. 2, and may include an associated memory 307. Memory 307 may be located within the same integrated circuit as processor 309, or may be a separate memory element. Also, memory 307 may be capable of storing data in a persistent way. In one embodiment, memory 307 is a nonvolatile memory that is capable of storing one or more performance data items and/or manufacturing data items associated with battery 301. In another embodiment, memory 307 may be an EEPROM. However, it should be appreciated that other types of memory may be used, and the invention is not limited to any particular memory type or configuration.

Processor 309 communicates data to/from battery module 301 via a communication circuit 305. Circuit 305 receives one or more data outputs and provides one or more data inputs to processor 309. In one embodiment, circuit 305 receives a serial output (ASYNC OUT) from processor 309 and provides a serial input (ASYNC IN) to processor 309. In one embodiment, data is transmitted to the UPS system in an asynchronous manner. That is, there is no clock maintained between sender (battery) and receiver (UPS system) and data is not transmitted at a particular defined point, but rather messages are transmitted at any point in time, and timing (clock) is recovered from the received signal.

Generally, timing information is extracted from asynchronous messages by detecting start and stop bits that delimit each asynchronous message. In one embodiment, data is transmitted as 8 bit words using one start and stop bit. Although messages may be transmitted asynchronously, it should be appreciated that other communication methods may be used.

Processor 309 also receives a clock signal from clock circuit 314, and clock circuit 313 may include an RC oscillator to reduce cost. To operate in this manner, processor 305 may recalibrate timing on every received command's start bit. Recalibration is possible, for example, if after receiving a start bit, a logical one must be received and is used as one baud period to decode the rest of the data as discussed further below with respect to FIG. 7. Alternatively, a crystal oscillator may be used to provide clocking as is known in the art.

Processor 309 receives inputs from one or more sensors 308 that provide indications relating to the performance of battery 301. Sensors 308 may include, for example, a temperature sensor (e.g., a thermistor) to detect temperature within a housing of battery 301. For instance, the thermistor may be placed in thermal contact with one or more portions of battery module 301 (e.g., one or more cells) to detect operating condition of the cell. Other sensors may be included within battery 301.

Battery module 301 may include a switch 315 used to disconnect the power from the UPS. Switch 315 includes a sense contact which is connected to battery monitor 304 and measured by the processor 309. R4 316 is connected to the output of the regulator 306 and functions as a pull-up resistor for the disconnect switch sense 315.

Figure 4:
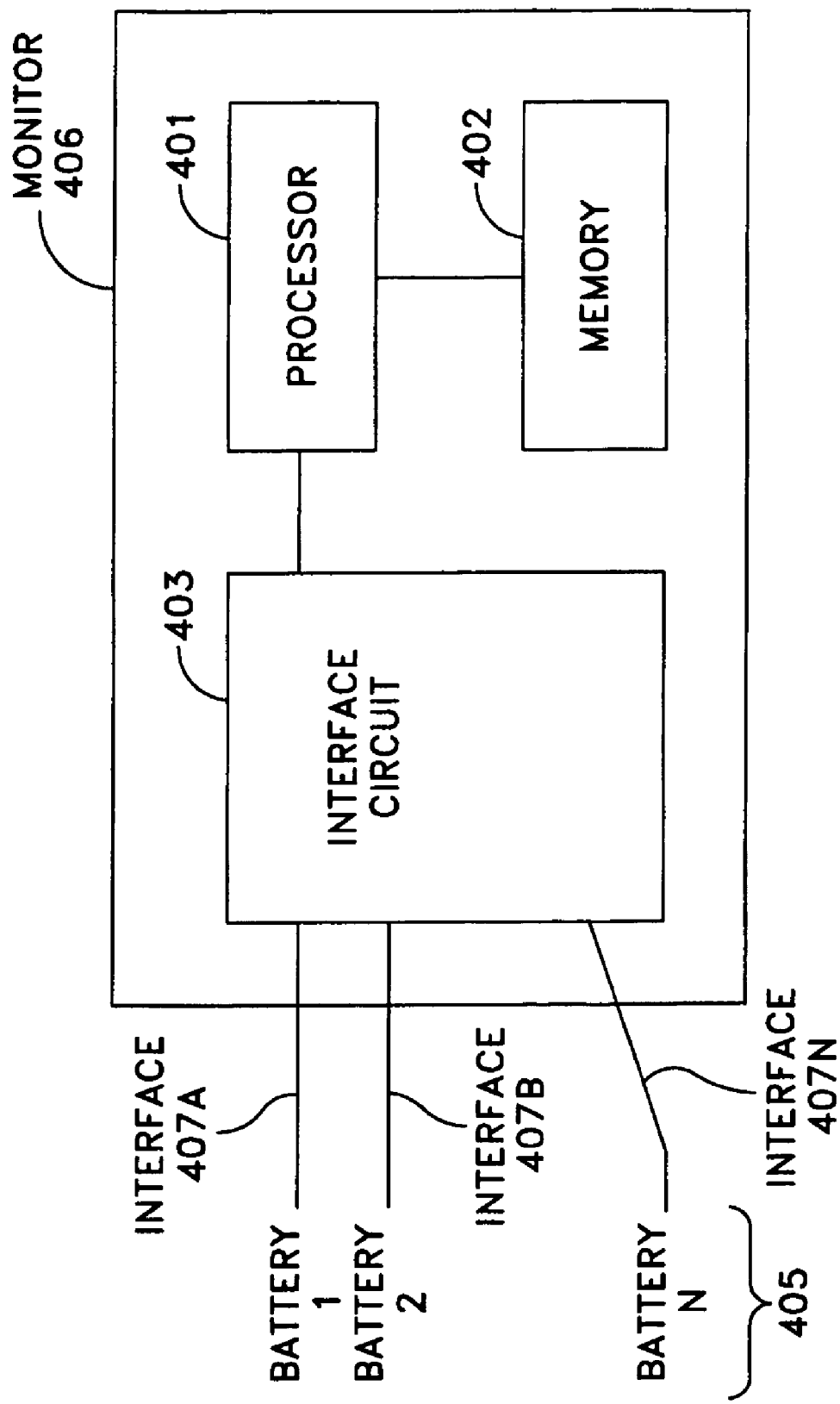
FIG. 4 is a block diagram showing an external monitoring system in accordance with one embodiment of the invention.

The UPS system may, according to one embodiment of the present invention, include additional circuitry to communicate with the battery module (e.g., battery 201, 301). FIG. 4 shows a monitor 406 capable of communicating with an improved battery, such as, for example, battery module 301 via battery monitor 304. In one embodiment of the present invention, monitor circuit communicates data by interrupting current to each battery in a pattern. In this manner, a monitor circuit (e.g., monitor 406) can use the same electrical interface as conventional batteries while being able to communicate information to/from improved batteries.

More particularly, monitor 406 receives performance and/or manufacturing data from the battery over the standard interface. For instance, monitor 406 may receive the battery's serial number, manufacture date, the number of discharges, a current state of health, battery operating temperature, and other information from the battery over this interface. In this manner, an integrated system is provided for reading battery presence, operating conditions and runtime of the battery using a single interface. Because, in one embodiment of the present invention, a single line is used to communicate to/from the battery, the number of connections to the battery is minimized. Performance information retrieved from the battery is then communicated to the UPS system processor which may be processor 401 as shown in FIG. 4, or monitor 406 may be in turn coupled to another processor (e.g., an overall monitor processor associated with the UPS system).

As shown in FIG. 4, monitor 406 connects to each battery via a separate connection (interface 407A to N) each of which is used to receive and transmit information to/from each battery. Having a separate connection to each battery module 301 allows isolation of faults between modules. As discussed above with reference to FIG. 3, the power supply/monitoring interface 303 is coupled the communication circuit 305 of each battery module 301. Such an interface 303 of each battery module (e.g., batteries 405) may be coupled to interface 407A to N. In one embodiment, interface 407(A) may be a single wire from each battery module.

As discussed, monitor 406 may be configured to monitor more than one battery module. In one embodiment, monitor 406 includes a processor 401 that monitors each of its attached batteries. Processor 401 sends one or more request messages to one or more batteries, and receives associated responses. Processor 401 includes an associated memory that is adapted to store data received from batteries (e.g., batteries 201, 301). Also, processor 401 may be capable of performing advanced monitoring functions such as determining whether an alarm should be set based on a measured value of a battery, determining remaining time for a UPS power circuit based on the batteries configured for that circuit, etc. Further, processor 401 may be accessible to a system administrator via an operator console (not shown) or network management system (also not shown) to provide indications such as battery temperature, the number of discharges, historical information or other information relating to battery operation (e.g., the number of discharges, the maximum operating temperature, etc.) for troubleshooting and maintenance purposes.

Processor 401 communicates with each battery module via a interface circuit 403 that receives requests from processor 401 and multiplexes requests to individual batteries 405 over interface 407. Monitor 406 also uses interface circuit 403 that receives responses from batteries 405 and passes these responses onto processor 401. According to one embodiment of the invention, communication is selected to only one battery at a time. In this embodiment, processor 401 sends a request for data (e.g., voltage, temperature, or other store data) and waits for the corresponding battery to respond. After this response is received, the processor selects the next battery to be monitored. Such an example communication is shown and discussed below with respect to FIG. 10.

Figure 5:
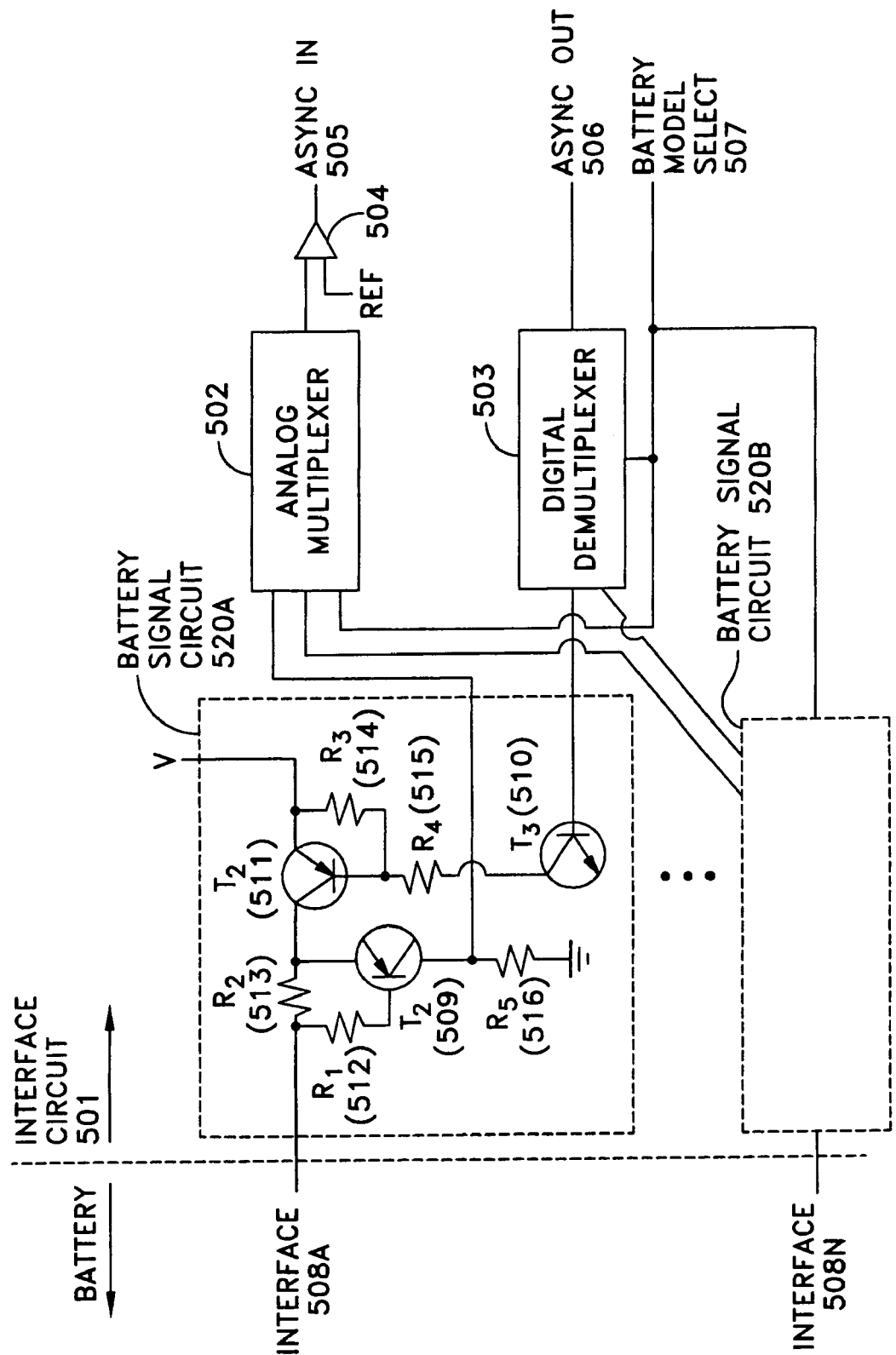
FIG. 5 is a block diagram showing an external monitoring system in accordance with another embodiment of the invention.

FIG. 5 shows an embodiment of a interface circuit 501 according to one embodiment of the invention. Interface circuit 501 is one possible implementation of monitor 406, and interface circuit 501 includes a number of components. More particularly, interface circuit 501 includes, for each battery, a battery signal circuit (item 520A, for example) that conditions the output signal to the battery as well as conditioning the received response signals. Circuit 520A receives an input signal from the battery modules (e.g., interface 508) and in one embodiment, communicates information to the battery modules using the same interface. In another embodiment, data is communicated back and forth to/from the battery modules over a single wire.

Interface circuit 501 provides data to the processor via ASYNC IN line 505 and provides data to the battery modules via ASYNC OUT line 506. The ASYNC IN circuit of the battery module includes a transistor that is responsive to the voltage drop when the current is interrupted by the monitor circuit being driven by ASYNC OUT from processor 401. That is, when the monitor circuit transmits data, the current provided on the 12V supply drops to substantially zero current. When the current drops, the processor of the battery detects a logical "1", and when the current is present, the processor detects a logical "0". The ASYNC OUT circuit directs power into interface 508 whenever ASYNC OUT from the processor 401 is low or open (which is the state of the processor 401 when the processor is unpowered or reset).

Interface circuit 501 senses the state of current flowing in interface 508 by measuring the voltage across R2 513 by setting current flow condition="1" by turning on transistor T2 509 which applies voltage on R5 516 which is a voltage greater than REF into comparator 504 which sets a "1" on ASYNC IN 505 going into processor 401. Then the current is interrupted either by the communication circuit 305 by disconnecting load off battery monitor 304 (e.g., all load) when ASYNC OUT is set to "0" by processor 309 or when T2 511 is open. The current is interrupted turning off transistor T2 509 which drops voltage on R5 516 which is a voltage less than REF into comparator 504 which sets a "0" on ASYNC IN 505 going into processor 401.

Interface circuit 501 drives the state of current in Interface 508 by processor 401 driving ASYNC OUT to "0" which turns off transistor T3 510 which in turn turns off T2 511 setting the current off which is a "0" on Interface 508. In battery module 301, communication circuit 305 detects the drop in voltage and drives ASYNC OUT into processor 309 to "0" state. Interface 508 is set to "0" state by the processor 401 driving ASYNC OUT to "0" which turns on transistor T3 510 which in turn turns on T2 511 setting the current on which is a "0" on Interface 508. In the battery module 301 communication circuit 305 detect the full voltage and drives ASYNC OUT into processor 309 to "1" state.

According to one embodiment, interface circuit 501 also includes multiple battery signal A to N each one of which is connected to an interface 508 each one of which is connected to power supply/monitoring interface 303 of a Battery Module 301. Each of the T2 509 from battery signal circuits 520 is connected to one of the inputs of the analog multiplexer 502 and any of the inputs are selected by processor 401 to connect to comparator 504, which reads data coming from the selected battery module 301. Each of the T3 510 from battery signal circuits 520 is connected to one of the outputs of the digital demultiplexer 503 and any of the inputs are selected by processor 401 to connect to comparator 504, which drives data coming to the selected battery module 301.

Processor 309 includes a circuit to reset processor 309 when the voltage supplied to processor 309 (e.g., from power supply/monitoring interface 303) goes low or has not yet risen or a delay after the voltage comes into an operating range.

A start bit (zero voltage) is detected as a low (as the time to be set as the transmission bit rate) followed by a high to allow the low to high transition to be the start bit which is the transmission bit rate of the following data. The transmission rates of communication circuits of the UPS (e.g., UARTS in the UPSs monitor or system processor) are fixed by the crystals which run these circuits (e.g., crystals associated with the microprocessors of the UPSs system module). Thus, the battery and UPS system may operate with different transmission rates and may be capable of communicating.

The UPS system processor (or processors) may monitor the presence and status of specific battery modules separately, and information from each battery is collected and coordinated in the UPS system processor where the data is stored and used for alarms, time remaining calculations, inventory management functions or other functions. The UPS system processor communicates with the battery modules by monitoring and interrupting current to the battery module. In one embodiment, each battery module receives a command from the UPS processor, and in response, provides a response to the command. According to one embodiment, either the monitor or UPS system monitor may include circuitry to particular batteries from communicating with the UPS over the single-wire interface, so that a communication fault in a particular battery does not affect monitoring of any other battery.

Figure 6:
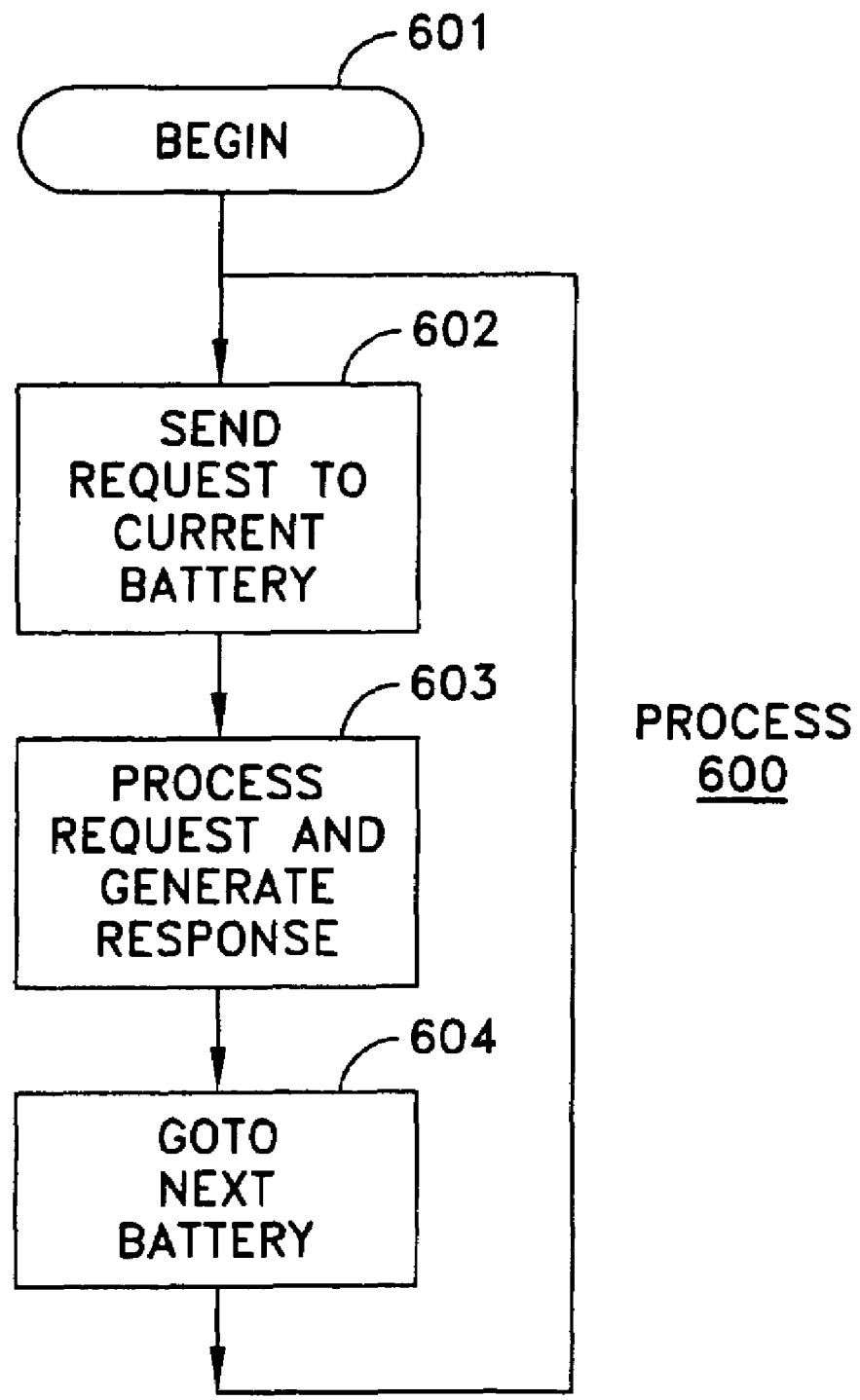
FIG. 6 is a flow chart showing a process for monitoring batteries in accordance with one embodiment of the invention.

FIG. 6 shows a process 600 for monitoring batteries in accordance with one embodiment of the invention. In particular, a monitor (e.g., monitors 406) of the UPS is capable of requesting and maintaining performance information relating to one or more batteries (e.g., batteries 405). At block 601, process 600 begins. At block 602, a monitor (e.g., monitor 406) sends a request to a currently selected battery. For instance, the battery may be selected by a multiplexer circuit (e.g., multiplexer 403 or analog multiplexer 502). The request may be in the form of a request message (e.g., a packet) as discussed below with reference to FIG. 8A.

At block 603, the selected battery receives and processes the request and in turn, generates a response. This response may also be in the form of a message which is transmitted to the monitor. One form of a response message is discussed below with respect to FIG. 8B. At block 604, the monitor proceeds to the next battery being observed by the monitor.

As discussed above, data may be read periodically from each battery. However, some data may be read at different times (e.g., when the UPS system is powered up or when a new battery is installed). For example, history data may be read during a power up period or when a new battery module is installed, and thereafter the history data can be synchronized on a regular basis. Therefore, data may be read from the battery either as a regular update that recurs at some frequency, or data may be polled from the battery depending on the state of the UPS system or function being performed by the UPS system.

Figure 7:
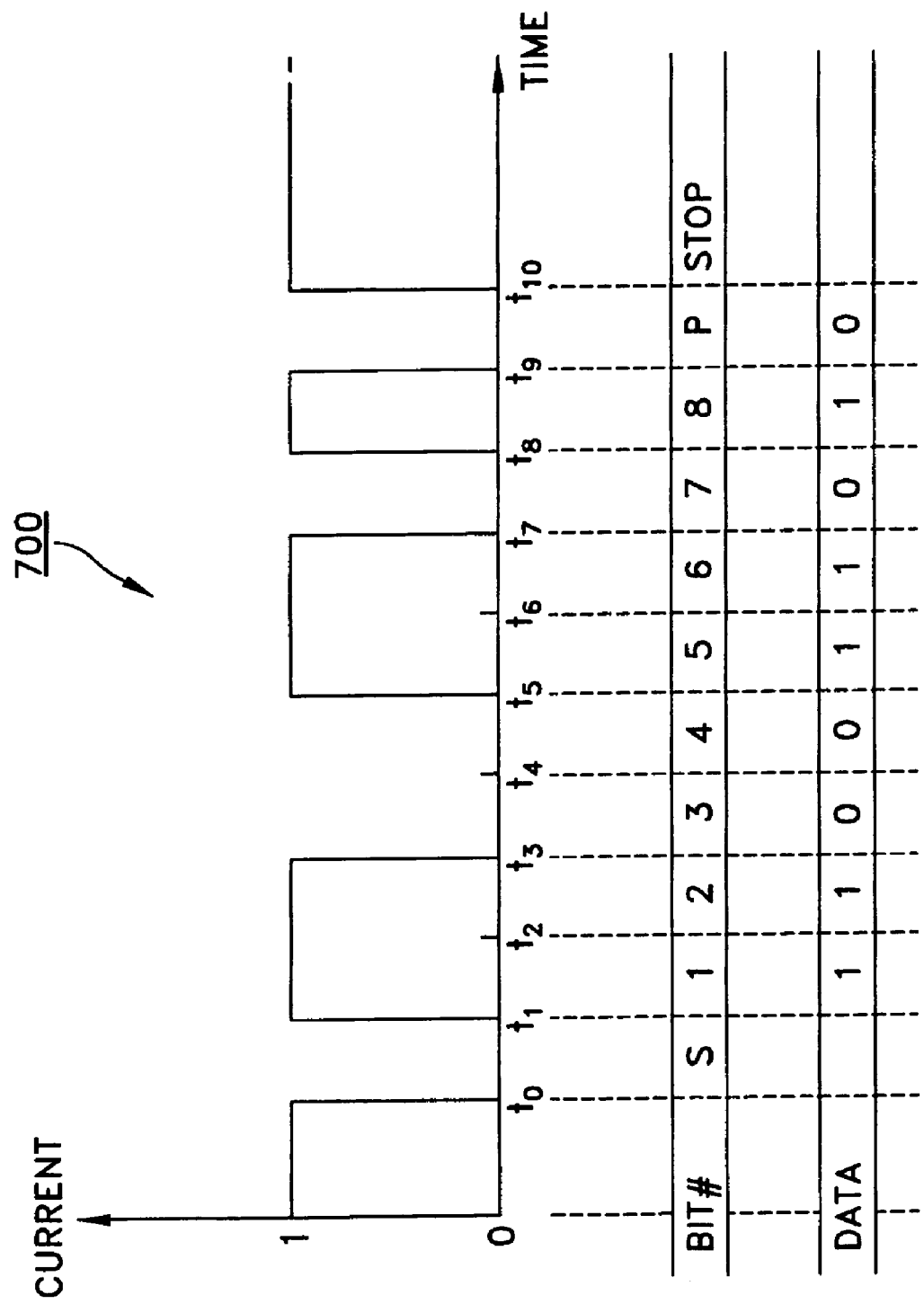
FIG. 7 is a chart showing data transmission between a battery and external monitoring system in accordance with one embodiment of the invention.

As discussed above, data may be transmitted asynchronously between a battery and an associated monitor circuit or UPS system processor. FIG. 7 shows an example format of the data transmission conducted between the battery and an external monitoring system in accordance with one embodiment of the invention. Chart 700 shows how current can be used to communicate information over a single wire interface between a battery and a UPS. In chart 700, data transmission starts at time $t_0$ when either the battery or the UPS system transitions the current to zero (a logical "1") indicating the start of the transmission. In one embodiment of the invention, a logical "1" is transmitted, when the current drops to 0, and a logical "1" is detected by a receiver of the data that monitors the current flow. For example, according to the waveforms shown in Chart 700, an 8-bit data word of "11001101" is transmitted by alternately adjusting current flow. As discussed above, the signal may be asynchronous in that clocking is obtained by extracting it from the start bit or bits included in the data word.

As discussed, data may be transmitted in the form of two byte words that are formatted into a request message and/or a response message. FIG. 8A shows an example format of a request message according to one embodiment of the invention. As shown, request message 801 includes a command portion 802 and a parameter portion 803. In another embodiment (not shown), request message 801 includes an error checking information for use in error checking (and/or correcting) the transmitted data words. In one embodiment of the invention, portions 802 and 803 may each be one byte in length.

In general, command 802 indicates the command to be executed by the battery. For example, there may be associated commands for writing, selecting, and reading particular operating data and/or manufacturing data associated with a battery module. In one embodiment of the invention, acceptable commands are listed in FIG. 9 as described further below.

FIG. 8B shows an example format of a response message according to one embodiment of the invention. As shown, response message 804 includes a parameter portion 805 and a parameter portion 806. In one embodiment of the invention, portions 805 and 806 may each be one byte in length. According to one embodiment of the invention, acceptable responses to commands are listed in table I as further described below. As discussed, parameter 805 may include information identifying the command type being responded to, and parameter 806 may include data (e.g., manufacturing and/or performance data) provided in response from the battery.

FIG. 9 shows an example command message format that may be used in a request message (e.g., request message 801) according to one embodiment of the invention. In one embodiment, a command 901 includes a command portion 902, battery address portion 903 and an end bit (e.g., a bit having a value of logical "1"). As discussed, commands may include a reset command that resets battery communication, a write memory command that causes an identified battery to write to a memory location, a read memory command, a read temperature command, a read voltage command, a read code revision command, or any other performance and/or manufacturing parameter.

Command portion 902 may include a number of valid command identifiers that instruct the battery to perform various commands as discussed above and as listed in table 904. Battery address 903 may, in one embodiment include three bits that identify eight ($2^3$) different batteries. This allows, for example, the UPS system and/or monitor to write to a memory of a particular battery identified by address 903. Some commands, such as the "READ" type commands shown in table 904 may be sent to all batteries and replied to by all batteries.

TABLE I

| Operations | Corresponding Response Packet [Byte 1] [Byte 2] [x x x x x x x x] [x x x x x x x x] |
|---|---|
| Memory Management | |
| SELECT ADDRESS | [0 0 0 $a_8$ 0 0 1 1] [$a_7$ $a_6$ $a_5$ $a_4$ $a_3$ $a_2$ $a_1$ $a_0$] |
| READ CURRENT ADDRESS | [0 0 0 0 0 1 1 1] [$d_7$ $d_6$ $d_5$ $d_4$ $d_3$ $d_2$ $d_1$ $d_0$] |
| WRITE CURRENT ADDRESS | [0 0 0 0 0 1 0 1] [$d_7$ $d_6$ $d_5$ $d_4$ $d_3$ $d_2$ $d_1$ $d_0$] |
| Request for Monitored Parameters | |
| SEND BATTERY VOLTAGE | [0 0 0 0 1 0 1 1] [$d_7$ $d_6$ $d_5$ $d_4$ $d_3$ $d_2$ $d_1$ $d_0$] |
| SEND TEMPERATURE | [0 0 0 0 1 0 0 1] [$d_7$ $d_6$ $d_5$ $d_4$ $d_3$ $d_2$ $d_1$ $d_0$] |
| Request Other Information | |
| SEND FIRMWARE REV. | [0 0 0 0 1 1 0 1] [$d_7$ $d_6$ $d_5$ $d_4$ $d_3$ $d_2$ $d_1$ $d_0$] |
| Reserved for Debug and Factory | |
| SEND MEASURED BIT WIDTH | [Bit Width Low Byte] [Bit Width High Byte] |

As shown above in Table I, a corresponding response message (e.g., message 804) can have a number of formats depending on the command to which the response message applies. As shown in FIG. 8B, a response message 804 may include parameter 805 and parameter 806 each of which may be one byte in length. In one embodiment of the invention, the first byte identifies the command type to which the response message 804 applies, and the second byte (parameter 806) corresponds to the data in response to the command. For example, when the command is a read command for a particular address, voltage, temperature, or other data, parameter 806 of the response message includes the data associated with the parameter being read.

As discussed, data stored in the battery may relate to performance information relating to battery operation or manufacturing data associated with the battery. Performance information stored may include historical data which is data that is maintained during discharge, recharge and floating periods of the battery. Performance information may also include trend data which presents a profile of a battery's health over time. The batteries may also store manufacturing data which is data that is stored during the manufacturing process of the battery.

As discussed above, data may be stored in a nonvolatile memory of an associated battery module. According to one embodiment of the invention, manufacturing data and/or other constant data is stored in nonvolatile memory of the battery. Manufacturing and other constant data may be stored in the memory of the battery in the example format as shown in Table II below. The example format includes 80 bytes of data and 2 bytes of checksum data as shown below:

TABLE II

| Location - Byte# | Name | Format | Description |
|---|---|---|---|
| 0-3 | Shunt Resistance | Floating Point | Calibrated resistance of current shunt |
| 4-7 | Max Whr | 32 bit Integer | WHr rating of this battery module |
| 8-9 | Max Pwr | 16 bit Integer | Maximum power this module can supply. |

TABLE II-continued

| Location - Byte# | Name | Format | Description |
|---|---|---|---|
| 10-13 | AWhrA | Floating Point | Battery constant |
| 14-17 | AWhrB | Floating Point | Battery constant |
| 18-21 | AWhrC | Floating Point | Battery constant |
| 22-25 | BVSV0 | Floating Point | Battery constant |
| 26-29 | BVSV1 | Floating Point | Battery constant |
| 30-33 | BVSV2 | Floating Point | Battery constant |
| 34-37 | BVK1 | Floating Point | Battery constant |
| 38-41 | BVK2 | Floating Point | Battery constant |
| 42 | TmpMConst | 8 bit integer | Slope correction factor for thermistor |
| 43 | TmpBConst | 8 bit integer | Offset correction factor for thermistor |
| 44-59 | Serial Number | ASCII String | Battery Module serial number |
| 60-71 | Model Number | ASCII String | Battery Module number |
| 72-79 | Mfg Date | ASCII String | Date of manufacture of battery module |
| 80-81 | Checksum | 16 bit Integer | Checksum for bytes 0 thru 79 |

As is shown above in Table II, the battery may store a calibrated resistance of the current shunt resistance. Because the resistance value may be stored in memory versus requiring a specific resistance value for each battery, less accuracy is required in selecting shunt resistors for each battery. That is, the UPS system can read the shunt resistance and adjust its measurements based on the specific battery type accordingly.

Further, the battery may store ratings of the battery such that they may be read by a UPS system and therefore automatically included in the UPSs time remaining calculation without operator intervention or additional programming steps. Further, because rating information can be stored in a number of different types of batteries having different rating information, the UPS system can therefore work with many different types of batteries having different ratings and still perform the remaining time calculation without operator intervention. Further, the battery may store battery constants that relate to the expected performance of the battery which can be used to estimate battery capacity. Conventional systems generally make assumptions that estimate the performance of each battery. To provide a more accurate calculation of time remaining in, battery performance may be measured more accurately during manufacturing and stored in memory of the battery and this stored information may be used to more accurately predict batteries performance in the field.

Constant information may also include information that relates to one or more sensors (e.g., a thermistor) that perform measurements within the battery. In conventional batteries, components need to be accurately selected so as the UPS may perform identical functions on every possible battery that may be installed in the UPS system. By storing particular values associated with sensors of the battery, a UPS may read this information and perform more accurate measurements as a result.

As discussed above, other manufacturing data may be included for tracking purposes, inventory control, or troubleshooting. For example, the serial number of the battery may be stored in battery memory, and therefore this value can be read by a UPS system using the various communication methods described above. Therefore, a particular battery may be tracked within different UPSs (e.g., through a network management station that communicates with each UPS, for example) to identify batteries as they are installed in one or more UPS systems.

Further, other manufacturing data like model number is useful for tracking particular models within each UPS. Further, the UPS system may be programmed to perform differently with certain models versus other models of batteries. A date of manufacture of the battery module may also be stored which is significant when determining when to replace batteries within the system (for example, batteries may be rated for a particular age and therefore older batteries may need to be replaced sooner than more recently-manufactured batteries). The example data format may also include a checksum or other error correction information that verifies the integrity of the data.

Historical data may also be stored in memory of the battery module. According to one embodiment of the invention, historical performance data may be stored in nonvolatile memory. Table III below shows an example format of historical data that is stored in the memory of a battery module.

Historical data is statistical data relating to battery operation that the UPS maintains over time, and may be updated periodically. For example, historical data may be updated every 2 minutes during discharge of a particular battery module, every 15 minutes during a recharge period and every 12 hours while the battery is floating. The example format in Table III includes 20 bytes of data and two bytes of checksum data as shown below:

TABLE III

| Location - Byte# | Name | Format | Description |
|---|---|---|---|
| 100-101 | DayUpdated | 16 bit Integer | Day index when history last updated |
| 102 | Discharges | 8 bit Integer | Count of complete discharges |
| 103 | CalFactor | 8 bit Integer | % health of battery. |
| 104-105 | Absolute WHr | 16 Integer | State of charge of the battery |
| 106-109 | Time Charging | 32 bit Integer | Accumulated time charging (Secs) |
| 110-113 | Time Floating | 32 bit Integer | Accumulated time floating (Secs) |
| 114-117 | Time Discharging | 32 bit Integer | Accumulated time discharging (Secs) |
| 118 | Max Temperature | 8 bit Integer | Maximum temperature measured by battery module |
| 119 | Unused | 8 bit Integer | Reserved |
| 120-121 | Checksum | 16 bit Integer | Checksum of bytes 100 thru 119 |

As is shown above in Table III, the battery may store historical performance information such as the number of complete discharges experienced by the battery. The number of discharges may be indicative of the use of the battery, and this number may indicate when the particular battery should be replaced. For instance, batteries may be rated for a certain number of discharge cycles, and therefore a more recently manufactured battery having a greater number of discharges should be replaced prior to an older battery experiencing less discharge cycles. The battery may also include a determination on its own health, and therefore may store in memory an evaluation of its health which can be obtained by the UPS system and used to determine whether or not the battery should be used, replaced, or isolated from the UPS system.

The current state of the charge of the battery may also be stored in battery memory. This information may be used in association with information obtained from other batteries to determine the amount of time remaining on the UPS system.

The battery may store other historical data that may indicate the historical use of the battery. For instance, a time charging parameter may be used to track the accumulated time in which the battery was charged (e.g., the total number of seconds in which the battery remained in the charging state). Further, a time floating parameter may be used to record the accumulated time that the battery remained in a floating state. Also, the battery may track the time that the battery remained in a discharging state. Significantly, performance parameters are stored and retained with the battery, and therefore travel with the battery as the battery moves between UPS systems.

The battery may also maintain a maximum temperature parameter that records the maximum temperature experienced by the battery module. Significantly, this temperature parameter is maintained with the battery, and therefore is persistent if the battery is moved to another UPS system. The example data format as shown in Table III may also include checksum or other error correction that verifies the integrity of the data.

Trend data includes data that defines a profile of the battery's health over time. The data is periodically stored, creating a snapshot periodically during battery operation. For example, a snapshot is recorded every 2 weeks when the battery is installed and operating. In one embodiment, the battery stores the last 50 readings (2 years worth of data) in a circular buffer of the battery. By reviewing the trend data, a gross profile of the battery module's life can be obtained. In one embodiment, 250 bytes of data (5 bytes time 50 sets of readings) is stored.

In the example shown below in Table IV, each set contains the following data:

TABLE IV

| Byte# | Name | Format | Description |
|---|---|---|---|
| 0-1 | Week Indentifier | 16 bit Integer | Identifies a week when this set of data was stored. |
| 2 | # Discharges | 8 bit Integer | Snapshot of discharge counter |
| 3 | CalFactor | 8 bit Integer | Snapshot of % health of battery. |
| 4 | Max Temperature | 8 bit Integer | Snapshot of Max temperature measured by battery |

As shown above in Table IV, certain data may be stored that is indicative of a battery's health over time. For instance, data such as the number of discharges of the battery, the percentage of health of the battery as measured by the battery, and the maximum temperature experienced by the battery. For these parameters, it may be useful to see their values over time, and therefore these values may be stored at particular intervals (e.g., weekly) in non-volatile memory.

In one embodiment of the present invention, sets of the data format shown above in Table IV are stored as shown below in Table V:

TABLE V

| Byte# | Name | Format | Description |
|---|---|---|---|
| 199 | Next Set Pointer | 8 bit Integer | Identifies start of circular buffer |
| 200-204 | Set 1 | 5 byte set | First set |
| 205-209 | Set 2 | 5 byte set | Second set |
| . | . | | |
| . | . | | |
| . | . | | |
| 445-449 | Set 50 | 5 byte set | Last set |

In the example data sets shown above in Table V, the battery stores 50 weekly readings (approximately two year's worth of data) in a circular buffer of the battery. As is shown above in Table V, the memory includes a pointer that identifies a starting point of the circular buffer. The buffer includes one or more sets (e.g., 50 sets) that are stored weekly in memory for one or more parameters. Although the data sets shown above may be stored weekly, any period may be used, and the invention is not limited to any particular period. Further, other parameters may be trended and the invention is not limited to the particular parameters discussed above with reference to Table IV, or the number of data sets shown above in Table V.

According to one embodiment of the present invention, the monitor issues a request to each battery module and receives a response in an asynchronous manner. The UPS system processor is capable of requesting information on a periodic or as needed basis to each battery module, depending on the necessary function being performed by the UPS system processor.

Figure 10:
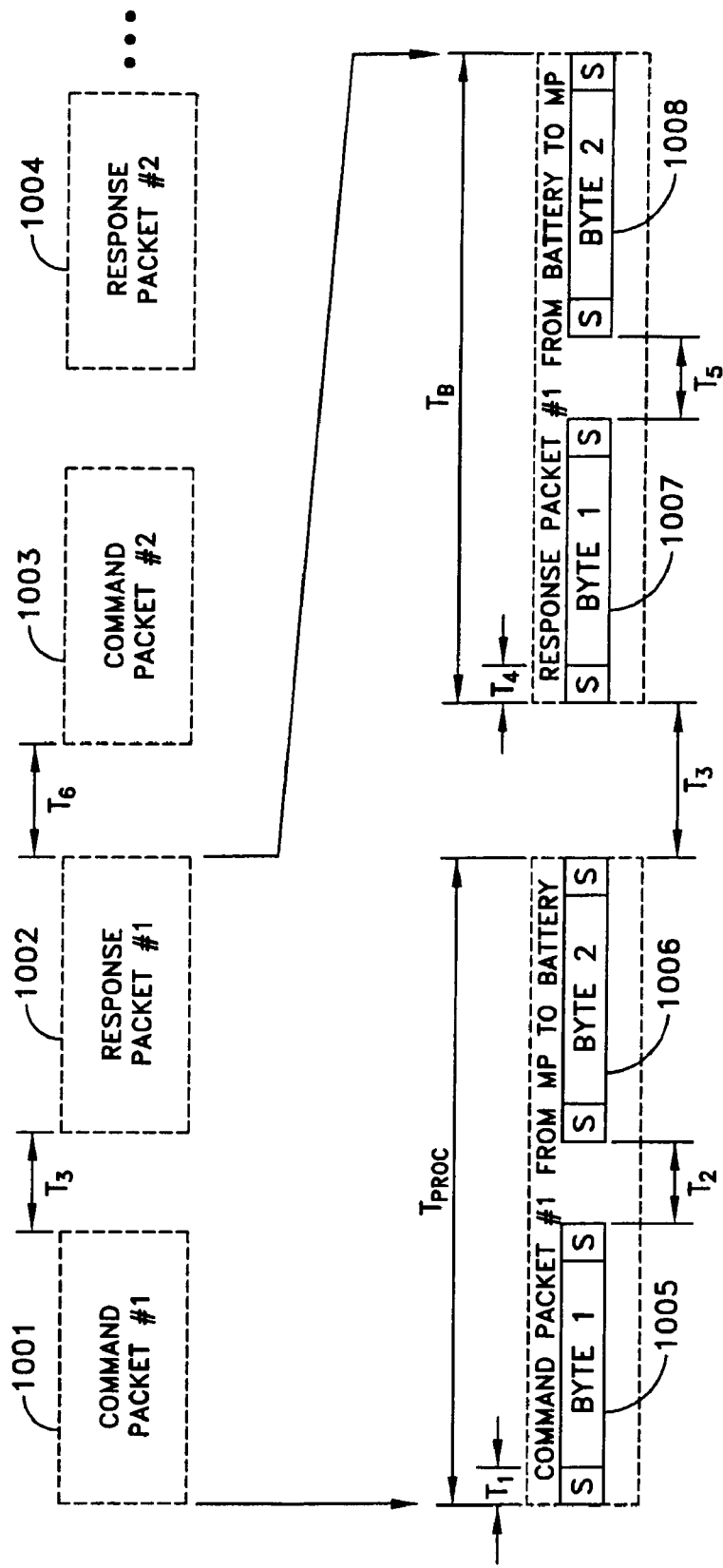
FIG. 10 is a block diagram of an example communication in accordance with one embodiment of the invention.

FIG. 10 shows a diagram of a communication sequence according to one embodiment of the invention. As discussed above with reference to FIG. 3, there is a power/communication line connection that couples the monitor (or UPS system processor) to the midpoint of each battery module. This connection provides return voltage from the midpoint of each battery module that may be used to monitor each module. Power (e.g., +12V) is supplied to the battery module which is in turn used to power the monitor circuit of the battery. Both the battery monitor and external monitor sense current flow as a logic 1 and interrupted current as a logic 0, resulting in a half duplex protocol.

Both the battery module and external monitor can interrupt the current flow to create a start bit and a following ASYNC communication byte. In one embodiment, the external monitor initiates communications and the battery module monitors the power supply line for an input starting pulse. Data may be then communicated serially using binary ASYNC communication. Other types of communication may be used. In one embodiment, data is transmitted at 2400 Baud, 1 start bit, 8 bit no parity, 1 stop bit, half duplex with the external monitor acting as a master by initiating all communication.

FIG. 10 shows a communication between a monitor processor (e.g., processor 309 or a UPS system processor) and a battery. In one embodiment, the processor sends a command packet 1 (item 1001) to a first battery and after a time $T_3$, the battery responds with a response packet 1 (item 1002). As shown in more detail in FIG. 10, the command packet 1 (1001) includes a transmission of two bytes of data limited by start and stop bits. A first byte 1005 is transmitted, and at some time $T_2$ later a second byte 1006 is transmitted to the battery. The two-byte command packet may be a request packet as discussed above with reference to FIG. 8A.

After a time $T_3$, the battery responds with response packet 1 (item 1002) that includes 2 bytes of information). More particularly, the battery responds with a first byte 1007 followed by a second byte 1008 at time $T_5$ later. In one embodiment, bytes 1 (1007) and byte 2 (1008) are delimited by start and stop bits.

As shown in FIG. 10, the external monitor sends a two-byte command and data set to the battery module, and the battery module responds with a two-byte format, echoing the command and including the requested data. In one embodiment, the master processor (external monitor) sends a control byte and a data byte to the slave processor (battery monitor) to read data or memory data from all battery monitors. The master processor can also send command and data to send data to be stored in the nonvolatile memory storage in the battery monitor circuit. Temperature and center voltage of the string of the battery monitor can be read and used by the UPS system (either the monitor processor or UPS system processor) to indicate faults or potential faults. As discussed, the nonvolatile memory storage in the battery monitor circuit may be used to store and retrieve constants that are associated with that battery module, such as, for example, serial number, current flow history, constants for battery runtime algorithm, calibration of sense resistor, battery condition (such as a shorted cell, for instance), and other parameters.

In Table VI below, are listed some example periods that may be used for transmitting messages according to one embodiment of the invention. For example, $T_1$ defines the baud rate at which data is transmitted from the monitor processor to the battery. Time period $T_2$ defines a time between the transmission of byte 1 and byte 2 from the monitor processor to the battery. Period $T_3$ defines the time between the monitor processor command packet and the response packet transmitted by the battery module. Period $T_4$ describes the transmission rate of the battery module. Period $T_5$ defines the time between the transmission of byte 1 and byte 2 from the battery module to the monitor processor. Period $T_6$ defines the time between the end of the response packet transmitted by the battery module and a new command packet subsequently issued by the monitor processor. The period $T_{PROC}$ defines a packet length of the command packet issued by the monitor processor. $T_B$ defines the battery module packet length set from the battery to the monitor processor.

TABLE VI

| Time | Description | Minimum | Nominal | Maximum |
|---|---|---|---|---|
| $T_1$ | Monitor processor baud rate period | | 416.67 µs | |
| $T_2$ | Time between monitor processor (MP) Byte1 and Byte2 | | | |
| $T_3$ | Time between monitor processor command packet and battery module response packet | 2 ms | | 6 ms |
| $T_4$ | Battery module baud rate period | −0.5% | $T_1$ | +0.5% |
| $T_5$ | Time between battery module Byte1 and Byte2 | 1.5 ms | | 5.5 ms |
| $T_6$ | Time between battery module response packet and new command packet | | | |
| $T_{PROC}$ | Monitor processor packet length = (16 + 4) * T1 + T2 | | | |
| $T_B$ | Battery module packet length = (16 + 4) * T4 + T5 | | | |

It should be appreciated that the timing requirements identified above are only examples, and that other timings (e.g., transmission rate, response times, etc.) may be used. The invention is not limited to the timing parameters outlined above.

The above-described embodiments of the present invention can be implemented in any of numerous ways. For example, the above-discussed functionality for monitoring energy storage devices can be implemented using hardware, software or a combination thereof. When implemented in software, the software code can be executed on any suitable processor. It should further be appreciated that any single component or collection of multiple components of the computer system that perform the functions described above can be generically considered as one or more controllers that control the above-discussed functions. The one or more controllers can be implemented in numerous ways, such as with dedicated hardware, or using a processor that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on the host computer. Rather, the term computer program is used herein in a generic sense to reference any type of computer code (e.g., software or microcode) that can be employed to program a processor to implement the above-discussed aspects of the present invention.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments. Further, for the one or more means-plus-function limitations recited in the following claims, the means are not intended to be limited to the means disclosed herein for performing the recited function, but are intended to cover in scope any means, known now or later developed, for performing the recited function.

Use of ordinal terms such as "first", "second", "third", etc., in the claims to modify a claim element or the order of such elements do not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A battery having an apparatus for monitoring the battery, the battery comprising:
one or more cells that provide power to at least one output; and
a monitor that is adapted to monitor and store performance information relating to the operation of the one or more cells, and which is adapted to communicate with an external system, and that is adapted to receive a monitor signal from the external system, wherein the monitor is coupled to the one or more cells and is adapted to receive power for the monitor from the external system and wherein the monitor communicates with the external system by actively suspending current of received power provided to the monitor by the external system.

2. The battery according to claim 1, wherein the external system comprises a portion of an Uninterruptible Power Supply (UPS) system.

3. The battery according to claim 1, wherein the monitor further comprises a processor, the processor including a circuit to reset the processor if the received power is insufficient.

4. The battery according to claim 1, wherein the monitor includes an associated memory in which the monitor is adapted to store the performance information.

5. The battery according to claim 4, wherein the memory is a nonvolatile-type memory.

6. The battery according to claim 5, wherein the nonvolatile-type memory is an EEPROM.

7. The battery according to claim 1, wherein the monitor is adapted to receive a monitor signal from the external system and wherein the monitor is adapted to receive power from the external system via the monitor signal.

8. The battery according to claim 1, wherein the monitor is adapted to communicate in an asynchronous manner with the external system.

9. The battery according to claim 1, wherein the monitor is adapted to store performance information indicating performance of the battery.

10. The battery according to claim 1, wherein the monitor is adapted to store the performance information periodically.

11. The battery according to claim 1, wherein the performance information includes a count of the number of discharges of the battery, and wherein the monitor is adapted to communicate the number of discharges of the battery to the external system.

12. The battery according to claim 1, wherein the performance information includes a software identifier of the monitor, and wherein the monitor is adapted to communicate the software identifier of the monitor to the external system.

13. The battery according to claim 1, wherein the performance information includes a temperature of the battery, and wherein the monitor is adapted to communicate the temperature of the battery to the external system.

14. The battery according to claim 1, wherein the performance information includes an accumulated time that the battery is in a charge state, and wherein the monitor is adapted to communicate the accumulated time to the external system.

15. The battery according to claim 1, wherein the performance information includes an accumulated time that the battery is in a floating state, and wherein the monitor is adapted to communicate the accumulated time to the external system.

16. The battery according to claim 1, wherein the performance information includes an accumulated time the battery is in a discharging state, and wherein the monitor is adapted to communicate the accumulated time to the external system.

17. The battery according to claim 1, wherein the performance information includes a maximum temperature experienced by the battery, and wherein the monitor is adapted to communicate the maximum temperature to the external system.

18. The battery according to claim 1, wherein the monitor is adapted to store manufacturing information relating to the battery.

19. The battery according to claim 18, wherein the manufacturing information includes a model type of the battery, and wherein the monitor is adapted to communicate the model type to the external system.

20. The battery according to claim 18, wherein the manufacturing information includes a serial number of the battery, and wherein the monitor is adapted to communicate the serial number to the external system.

21. The battery according to claim 18, wherein the manufacturing information includes rating information of the battery, and wherein the monitor is adapted to communicate the rating information to the external system.

22. The battery according to claim 18, wherein the manufacturing information includes a manufacturing date of the battery, and wherein the monitor is adapted to communicate the manufacturing date to the external system.

23. The battery according to claim 18, wherein the manufacturing information includes one or more battery constants, and wherein the monitor is adapted to communicate the one or more battery constants to the external system.

24. The battery according to claim 18, wherein the manufacturing information includes one or more battery constants that relate to the battery's expected performance, and wherein the monitor is adapted to communicate the one or more battery constants to the external system.

25. The battery according to claim 18, wherein the battery further comprises a temperature sensor, and wherein the manufacturing information includes one or more constants relating to the temperature sensor, and wherein the monitor is adapted to communicate the one or more constants to the external system.

26. The battery according to claim 18, wherein the battery further comprises a resistor used to detect current provided by the battery, and wherein the manufacturing information includes parameters related to the resistor, and wherein the monitor is adapted to communicate the parameters related to the resistor to the external system.

27. A battery having an apparatus for monitoring the battery, the battery comprising:
one or more cells that provide power to at least one output; and
a monitor that is adapted to monitor and store performance information relating to the operation of the one or more cells, and which is adapted to communicate with an external system, and that is adapted to receive a monitor signal from the external system, wherein the monitor is coupled to the one or more cells and is adapted to receive power for the monitor from the external system and wherein the monitor communicates with the external system by actively suspending current of received power provided to the monitor by the external system,
wherein the monitor is adapted to communicate in an asynchronous manner with the external system, and
wherein a start of communication with the battery is initiated by the external system by interrupting the current of the power supply.

28. The battery according to claim 27, wherein the monitor is adapted to detect the start of communication, and is adapted to receive, after the start of communications is detected, a request message from the external system.

29. The battery according to claim 28, wherein the monitor is adapted to transmit a response message in response to the received request message.

30. The battery according to claim 29, wherein the monitor comprises an LC-type oscillator that provides clocking for the monitor.

31. The battery according to claim 29, wherein the monitor comprises a crystal oscillator that provides clocking for the monitor.

* * * * *